United States Patent [19]

Barber

[11] Patent Number: 4,842,485

[45] Date of Patent: Jun. 27, 1989

[54] BALANCED TURBINE ROTOR AND METHOD FOR MAKING THE SAME

[75] Inventor: Ralph R. Barber, Waxhaw, N.C.

[73] Assignee: Westinghouse Electric Corp., Pittsburgh, Pa.

[21] Appl. No.: 154,401

[22] Filed: Feb. 10, 1988

[51] Int. Cl.[4] .............................................. F01D 5/10
[52] U.S. Cl. ................. 416/144; 74/573 R; 411/55; 411/265
[58] Field of Search ......... 416/144; 74/573 R; 411/55, 60, 57, 85, 84, 265, 266, 267, 269, 268, 270

[56] References Cited

U.S. PATENT DOCUMENTS

| | | | |
|---|---|---|---|
| 1,052,830 | 2/1913 | Kennedy | 411/55 |
| 2,334,285 | 11/1943 | Philippi | 74/573 R |
| 2,384,918 | 9/1945 | Houk | 411/55 |
| 2,665,546 | 1/1954 | Von Haaften | 74/573 R |
| 3,736,811 | 6/1973 | Neary | 416/144 |
| 3,887,990 | 6/1975 | Wilson | 411/265 |

FOREIGN PATENT DOCUMENTS

| | | | |
|---|---|---|---|
| 457893 | 6/1950 | Italy | 411/55 |
| 72937 | 6/1980 | Japan | 74/573 R |
| 137806 | 9/1920 | United Kingdom | 411/55 |

*Primary Examiner*—Robert E. Garrett
*Assistant Examiner*—John T. Kwon

[57] ABSTRACT

A balanced turbine rotor has a cylindrical member with a pair of opposed end shafts and an enlarged central portion, the enlarged central portion having first and second faces, with a circular groove formed in at least one of the faces and expandable weight assemblies engageable in the groove. The weight assemblies have an arcuate body member and an expander screw, the arcuate body member formed into upper and lower deformable sections by a bore therethrough and slots from side walls thereof to the bore, such that the expander screw forces the deformable sections apart to secure the weights at any desired location about the groove in the face of the enlarged central portion of the rotor.

7 Claims, 2 Drawing Sheets

BALANCED TURBINE ROTOR AND METHOD FOR MAKING THE SAME

The invention relates to a balanced turbine rotor and to a method for balancing a turbine rotor using expandable weight assemblies that are engageable in a groove in the end face of the enlarged central portion of a turbine rotor.

The use of turbines, such as steam turbines to produce electricity is well known. Such turbines are provided with central rotatable rotors that are disposed in a housing, with an array of radially extending blades secured to the rotor which, upon impingement by steam, cause the rotor to rotate and operate an electrical generating device. The rotors used in such turbines are generally made from large steel alloy forgings that are then machined into a shape that comprises an enlarged cylindrical section with opposed coaxial shafts extending from opposite ends of the cylindrical section. The size of the rotors is such that, prior to their use, balancing of the same is required for efficient operation. The enlarged cylindrical section, where meeting the opposed shafts, have end faces that are used in the balancing of the rotor.

In conventional balancing of such a rotor, tapped bores are formed in the end face of the enlarged cylindrical section, concentric to the axis of the shafts, and threaded plugs are inserted into selected tapped bores that will result in a balancing of the rotor through the additional weight of the plugs at various locations in the face of the enlarged cylindrical section. A large number of such tapped bores are normally provided in the face, such that a variety of various weight variations can be provided. The drilling and tapping of these balance holes for the balance plugs is very time consuming. With the high investment in the rotor materials, it is desirable to minimize the cycle time between purchasing of the material and completion of a balanced rotor.

It is believed that some existing rotors have a groove or channel in the face of the enlarged cylindrical section, with tapped bores at the groove, such that the balance weights can be secured at the face by set screws threadedly engaged in the tapped bores. As with the tapped bores and plugs, however, this system of balancing requires the time consuming procedure of tapping of numerous bores in the face of the enlarged cylindrical section and has a limited number of areas where weight can be added.

It is an object of the present invention to provide a balanced turbine rotor that does not require the boring and tapping of balance holes in the end faces thereof.

It is another object of the present invention to provide a method for balancing a turbine rotor where weight can be supplied at any location about the face thereof, without being limited to supplying weight at locations of previously drilled bores or the need to form additional bores in the face thereof.

SUMMARY OF THE INVENTION

With these objects in view, the present invention resides in a balanced turbine rotor comprised of a cylindrical member having a pair of opposed end shafts and an enlarged central portion, the enlarged central portion having first and second end faces, a circular groove in at least one of said end faces concentric with the end shafts, and expandable weight assemblies engageable within the circular groove, such that the weight assemblies are insertable into the groove, in a direction parallel to the axis of the end shafts, and expandable therein to secure the same in a predetermined location about the end face.

The expandable weight assemblies that are inserted into the groove in the face of the turbine rotor preferably comprise an arcuate body member having a rear wall, side walls, top and bottom arcuate walls and a front wall, with a threaded bore formed from the front to the rear wall, the threads terminating at a spaced location from the rear wall, and a slot formed in each side wall extending from the side wall outer surface to the threaded bore forming upper and lower deformable sections, and an expander screw within the threaded bore arranged to spread the upper and lower deformable sections apart to secure the arcuate body in the groove.

A radially inwardly extruding lip is provided adjacent the face of the turbine rotor enlarged central portion, which lip extends into the groove, and the bottom wall of the arcuate body has a recess at the edge of the arcuate wall, with the lip seated in the recess when the upper and lower sections of the arcuate body are spread apart.

The present invention provides for reduced cycle time for rotor machining compared to current methods of drilling and tapping holes in the rotor faces. Also, increased balancing is provided since the present expandable weight assemblies can be placed in any desired position about the groove in the face of the rotor, whereas previous designs were limited to weight placement where tapped holes were provided in, or added to, the face of the rotor.

DESCRIPTION OF THE DRAWINGS

The invention will become more readily apparent from the following description of the preferred embodiments thereof shown, by way of example only, in the accompanying drawings, wherein.

DETAILED DESCRIPTION

Figure 1:
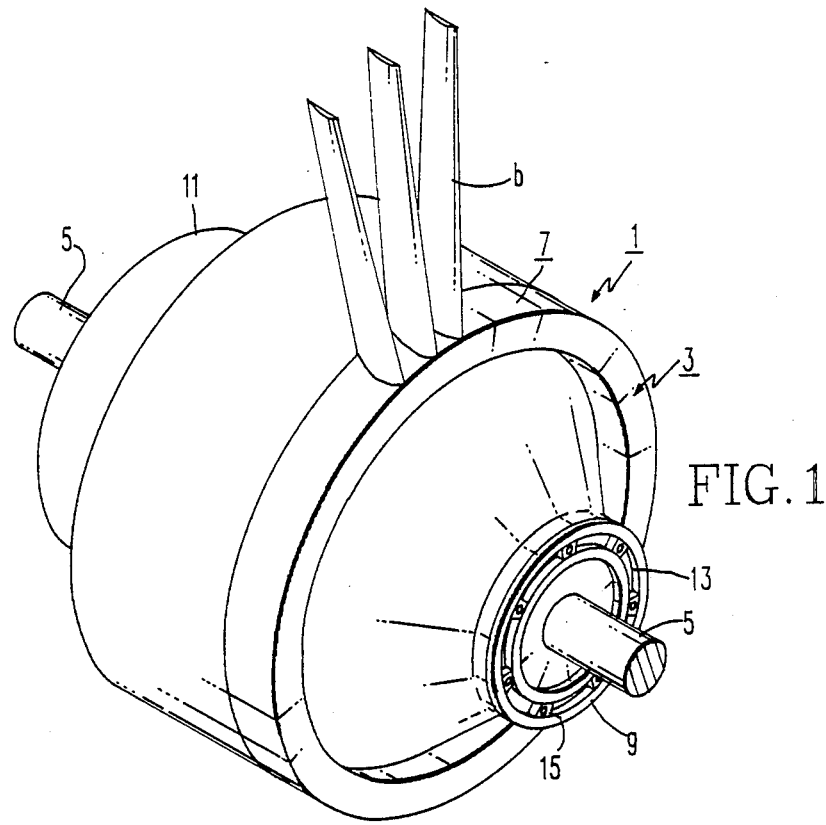
FIG. 1 is a perspective view of a balanced turbine rotor having expandable weight assemblies of the present invention.
Figure 2:
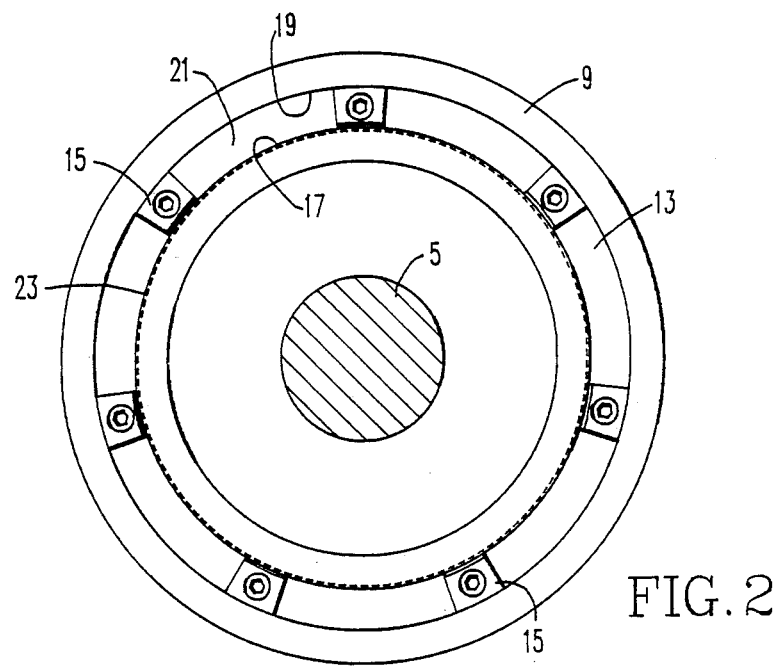
FIG. 2 is an end view of the balanced turbine rotor illustrated in FIG. 1.

Referring now to the drawings and particularly to FIGS. 1 and 2, a balanced turbine rotor 1 is illustrated comprising a cylindrical member 3 which has a pair of opposed end shafts 5 and an enlarged central portion 7. The enlarged central portion 7 has first and second faces 9 and 11 respectively, as is conventional. At least one of said end faces 9 and 11, and preferably both said faces, has a circular groove 13 formed therein, which groove 13 is concentric with the end shafts 5. Turbine blades b are illustrated as attached to the peripheral wall of the enlarged central portion 7.

The circular groove 13, as shown in FIG. 2, extends completely around the face 9 (360°) concentric to the shaft 5, which groove accepts expandable weight assemblies 15 at locations therein determined by the locations needed to balance the rotor 1. The groove 13, formed in the first and second faces 9, 11, is formed by bottom arcuate surface 17, top arcuate surface 19 and rear surface 21 in the enlarged central portion 7. An arcuate surface, preferably bottom surface 17 is provided with a radially extending lip 23 (FIG. 4) adjacent the face of the enlarged central portion 7, which lip 23 extends radially into the groove 13.

Expandable weight assemblies 15 are insertable into and engageable within the circular groove 13 and are expanded within the groove 13 so as to secure the same at a predetermined location about the end faces 9 and 11. An embodiment of the expandable weight assemblies, illustrated in FIGS. 3 to 5, comprise an arcuate body member 25 and expander screw 27. The arcuate body member 25 has a rear wall 29, side walls 31, top and bottom arcuate walls 33, and a front wall 35. A threaded bore 37 is formed from the front wall 35 to the rear wall 29, the threads of which terminate at a spaced location from the rear wall 29, while a slot 39 is formed in each of the side walls 31 which extends from the front wall 35 and terminates at a spaced location from the rear wall 29, and extends from the side wall outer surface 41 to the threaded bore 37 to form an upper deformable section 43 and lower deformable section 45 of the arcuate body member 25. One of the arcuate bottom or top walls 33, preferably the bottom wall, has recess 47 formed therein, extending from the front wall 35.

The expander screw 27 has a first end 49 and second end 51, with a threaded intermediate section 53 having threads that are threadably engageable with the walls of the threaded bore 37. Preferably, the first end 49 has a hollow 55 therein which may be engaged by a tool, such as an allen wrench, to rotate the same, and the expander screw intermediate section 53 is tapered, with the first end 49 thereof having a diameter larger than the second end 51.

Figure 5:
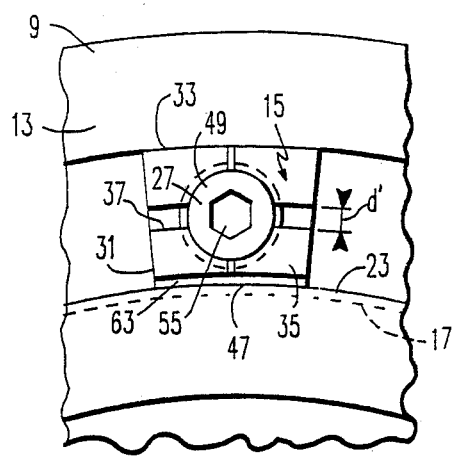
FIG. 5 is a front elevational view of an expandable weight assembly engaged within a groove in the end face of the balanced turbine rotor.

In securing the expandable weight assemblies 25 in the circular groove 13 formed in first end face 9, second end face 11, or both faces, the expander screw 27 is threadedly engaged with the threaded bore 37 of the arcuate body member 25 but not such as would spread the upper deformable section 43 away from the lower deformable section 45. The two deformable sections 43 and 45 are spaced apart a distance d (FIG. 3) upon such initial threaded engagement. An expandable weight assembly 15, comprising arcuate body member 25 and expander screw 27 is then inserted into the circular groove 13, in a direction parallel to the axis of the shafts 5, at any desired position about the circular groove and, when the desired positioning is achieved, the expander screw 27 is threaded further into the threaded bore 37 so as to spread apart the deformable upper and lower sectons 43, 45 of the arcuate body portion 25, such that the distance therebetween, at the front wall 35, indicated as d' in FIG. 5, is larger than the original spacing d.

Figure 4:
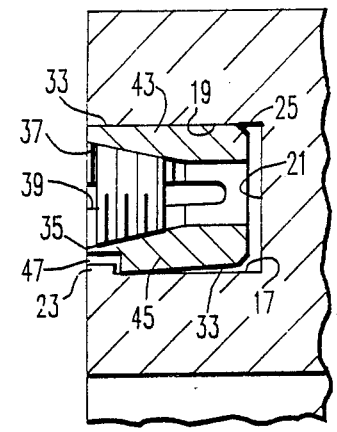
FIG. 4 is a vertical sectional view through an expandable weight assembly showing the expander screw in position and the arcuate body member locked into the groove of a balanced turbine rotor.
Figure 3:
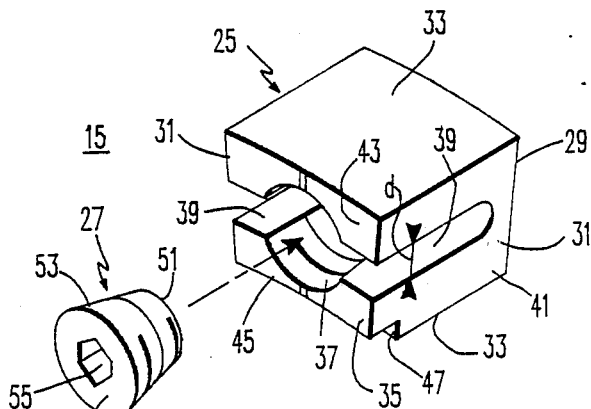
FIG. 3 is an exploded view of the expandable weight assembly used in the balanced turbine rotor of the present invention.
Figure 6:
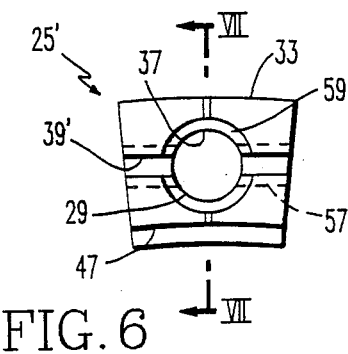
FIG. 6 is a front view of another embodiment of the arcuate body member of the expandable weight assembly.
Figure 7:
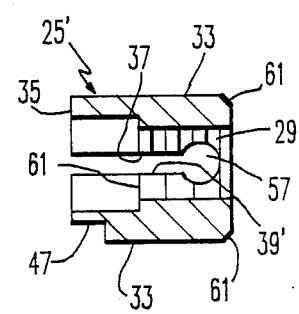
FIG. 7 is a view taken along the lines VII—VII of FIG. 6.

In a further embodiment of the arcuate body member 25, illustrated as 25' in FIGS. 6 and 7, the slot 39' in side walls 31 terminates in an enlarged portion in a keyhole-type design. The slot 39' extends from the front wall 35 towards the rear wall 29 but terminates at a spaced location therefrom and an enlarged portion 57 is formed in the slot. Also, preferably a counterbore 59 is formed in the front wall 35 of the arcuate body member 25', which counterbore is untapped and concentric with the threaded bore 37. The slot 39', as illustrated, may extend horizontally from the side wall outer face 41 to the threaded bore 37, or, as illustrated in FIGS. 3 to 5, may be of an arcuate shape as is slot 39. Preferably, the rear wall 29 of the arcuate body members 25, 25' have a bevel 61 at the juncture of the top and bottom arcuate walls 33 and the rear wall 29 thereof.

The present method for balancing a turbine rotor comprises the formation, such as by machining, of the circular groove 13 in the end faces 9 and 11 of the enlarged central portion 7 of a rotor and providing a plurality of the expandable weight assemblies 15. The expandable weight assemblies 15 are inserted into the groove 13 in a direction parallel to the axis of the shafts 5 and engaged therein at predetermined locations about the end face so as to balance the rotor. After proper positioning of the expandable weight assemblies 15, the same are expanded by threading of the expander screw 27 into the bore 37 so as to spread apart the upper deformable section 43 and lower deformable section 45 of the arcuate body member 25 and secure the weights in place. A small gap 63 is provided between the lip 23 and arcuate wall 47 (FIG. 5), such that if an expandable weight 15 is to be moved about the groove 13, or removed therefrom, a screw driver or similar bladed tool can be inserted therein to force the deformable sections towards each other, after removal of the expander screw 27.

During insertion of the expandable weight assembly into the groove, the hollow 55 in the expander screw 27 serves as a means for holding the expander screw 27 and arcuate body member 25, which have been initially threadedly engaged, during insertion of the same into the groove. After engagement, the corners of the arcuate body member 25 prevent rotation of the same during threading of the expander screw 27 therein. As the screw 27 is threadedly engaged further into the bore 37, the tapered threads produce a wedging force to spread the upper and lower deformable sections 43, 45 apart. The arcuate body member 25 is constrained from the expansion by the groove walls 17, 19 of the groove 13 in the rotor, resulting in a normal force between the expandable weight assembly at both the groove walls. The resulting normal force produces frictional restraint of the expandable weight assembly 15 in a circumferential direction. Orientation of the groove prevents radial movement of the expandable weight assembly, but allows moisture drainage during layup. The lip 23 prevents axial movement of the expandable weight assembly after the same has been expanded and engaged in the groove 13.

The present system reduces the cycle time for rotor machining compared to the current method of drilling and tapping holes. Also, a standardization of balance weight size is provided due to the infinitely variable positioning of expandable weight assemblies about the groove of the rotor face.

I claim:
1. A balanced turbine rotor comprising:
   a cylindrical member having a pair of opposed end shafts and an enlarged central portion, the enlarged central portion having first and second end faces;

a circular groove in at least one of said end faces concentric with the end shafts; and expandable weight assemblies engageable within said circular groove, such that said weight assemblies are insertable into said groove in a direction parallel to the axis of the end shafts and expandable therein to secure the same in a predetermined location about the end face; said expandable weight assemblies comprising an arcuate body member having a rear wall, side walls, top and bottom arcuate walls and a front wall, with a threaded bore formed from the front to the rear wall, terminating at a spaced location from the rear wall, and a slot formed in each side wall extending from the side wall outer surface to said threaded bore forming upper and lower deformable sections; and an expander screw threadedly engageable within said threaded bore arranged to spread said upper and lower deformable sections apart to secure said body in said circular groove, wherein a radially inwardly extending lip is provided, adjacent said face, which lip extends radially into said groove, and the bottom wall of said body has a recess therein at the edge of a said arcuate wall, with said lip seated in said recess when said upper and lower deformable sections of the body are spread apart, wherein the radially extending lip is radially spaced from the bottom arcuate wall of the body member.

2. A balanced turbine rotor as defined in claim 1 wherein said threaded bore has a diameter at the front wall of said body and a smaller diameter at the terminus thereof.

3. A balanced turbine rotor as defined in claim 2 wherein said screw has a first end with a hollow therein adapted for engagement by a tool and a second end of a diameter smaller than said first end.

4. A balanced turbine rotor as defined in claim 1 wherein said slot has an enlarged portion at the termination thereof at the spaced location for said rear wall.

5. A balanced turbine rotor as defined in claim 4 wherein said slot extends from the outer surface of the side wall into said threaded bore in a horizontal direction.

6. A balanced turbine rotor comprising:
a cylindrical member having a pair of opposed end shafts and an enlarged central portion, the enlarged central portion having first and second end faces;
a circular groove in at least one of said end faces concentric with the end shafts;
a radially inwardly extending lip, adjacent said at least one of said end faces, extending radially into said groove; and
a plurality of expandable weight assemblies, each comprising an arcuate body member having a rear wall, side walls, top and bottom arcuate walls and a front wall, with a recess in the bottom arcuate wall, and a threaded bore formed from the front to the rear wall, terminating at a spaced location from the rear wall, and a slot formed in each side wall extending from the side wall outer surface to said threaded bore forming upper and lower deformable sections; and an expander screw threadedly engageable within said threaded bore arranged to spread said upper and lower deformable sections apart to secure said body in said circular groove; such that said weight assemblies are insertable into said groove, in a direction parallel to the axis of the end shafts, and expandable therein, with said lip seated in said recess, to secure the same in a predetermined location about the end face wherein the radially extending lip is radially spaced from the bottom arcuate wall of the body member.

7. A balanced turbine rotor as defined in claim 6 wherein said slot has an enlarged portion at the termination thereof at the spaced location from said rear wall.

* * * * *